United States Patent [19]
Domoleczny

[11] Patent Number: 5,761,300
[45] Date of Patent: *Jun. 2, 1998

[54] RADIOTELEPHONE HAVING A HINGE APPARATUS INCLUDING A SELF-LATCHING HINGE SHAFT

[75] Inventor: James D. Domoleczny, Vernon Hills, Ill.

[73] Assignee: Motorola, Inc., Schaumburg, Ill.

[*] Notice: The term of this patent shall not extend beyond the expiration date of Pat. No. 5,629,979.

[21] Appl. No.: 735,723

[22] Filed: Oct. 23, 1996

Related U.S. Application Data

[63] Continuation of Ser. No. 386,172, Feb. 9, 1995, Pat. No. 5,629,979, which is a continuation of Ser. No. 696,430, May 6, 1991, abandoned.

[51] Int. Cl.⁶ ............................................. H04M 1/00
[52] U.S. Cl. ................................. 379/433; 379/434
[58] Field of Search ............................ 379/433, 434, 379/428; 455/89, 90, 575; 16/334, 321

[56] References Cited

U.S. PATENT DOCUMENTS

| | | | |
|---|---|---|---|
| 4,897,873 | 1/1990 | Beutler et al. | 379/433 |
| 5,185,790 | 2/1993 | Mischneko | 379/433 |

*Primary Examiner*—Jack Chiang
*Attorney, Agent, or Firm*—Kevin D. Kaschke

[57] ABSTRACT

A hinge apparatus rotatably couples about an axis of rotation (303) a body portion (101) and a flip element (103) of a foldable radiotelephone (100). The hinge apparatus includes a hinge shaft (205) having an unlatched and latched position on the axis of rotation (303) relative to the body portion (101). The hinge shaft (205) may be removably latched to a front housing portion (231) of the body portion (101) wherein the hinge apparatus may be tested before final assembly of the foldable radiotelephone (100). The hinge shaft (205), accessible through a slot (245) in the body portion (101), may be removably latched from the outside of the body portion (101).

13 Claims, 4 Drawing Sheets

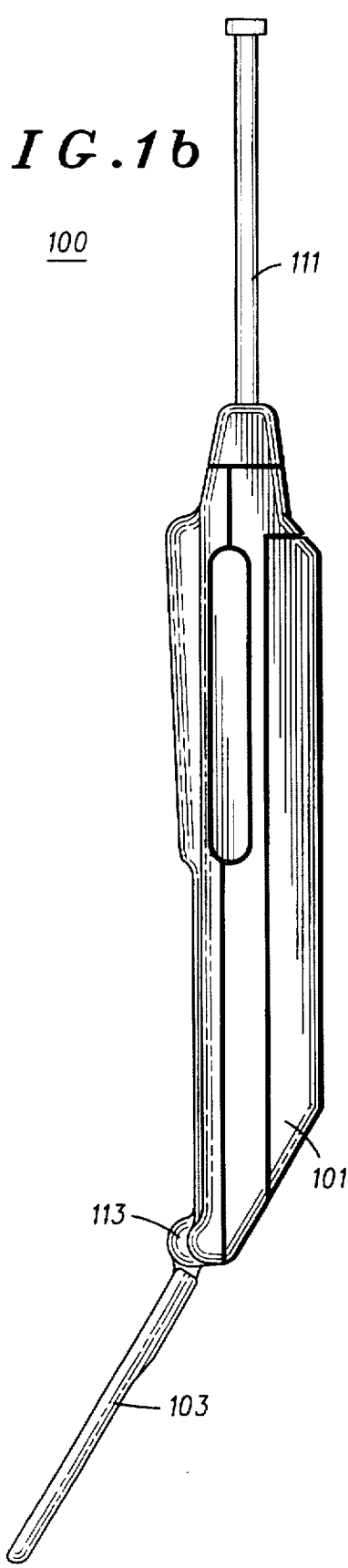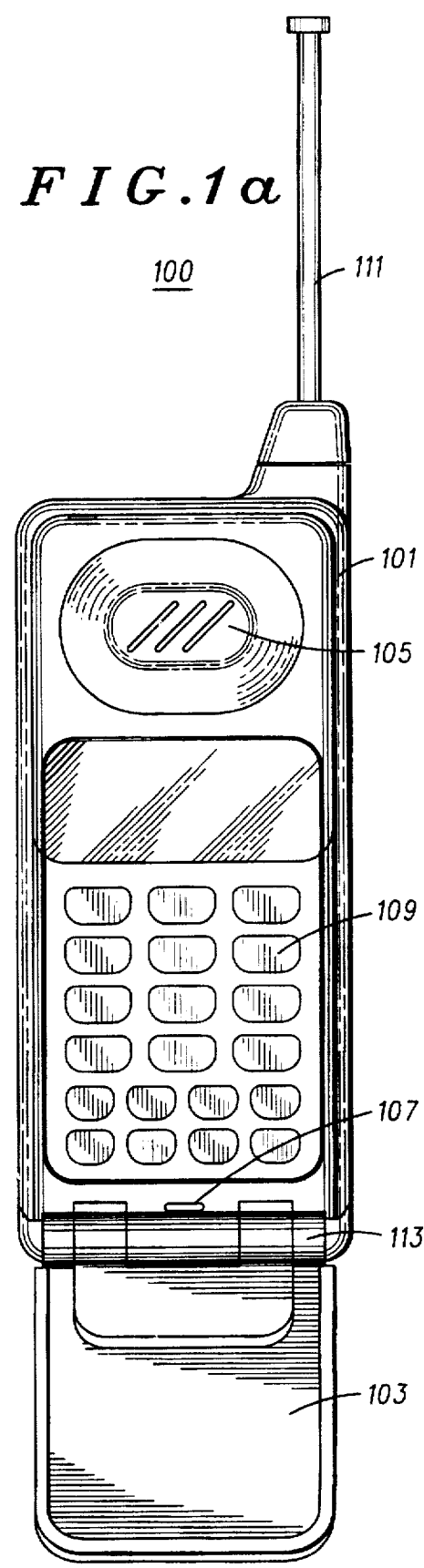

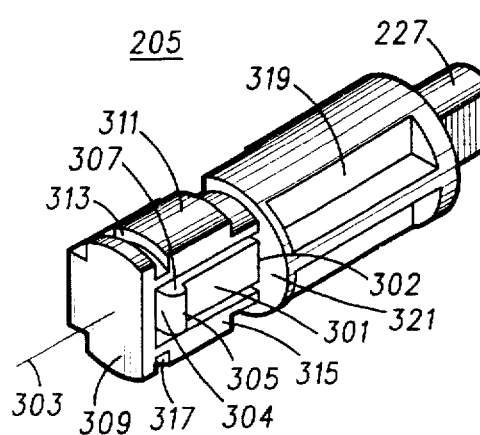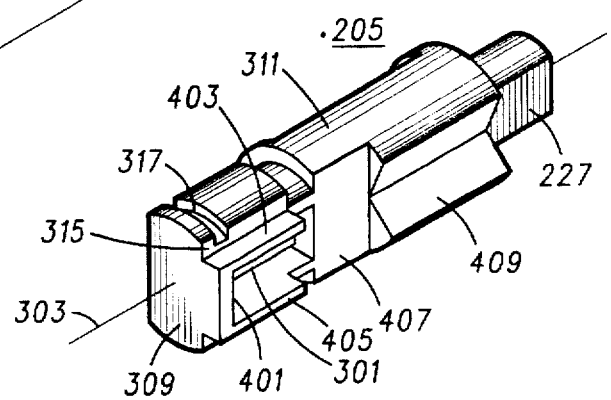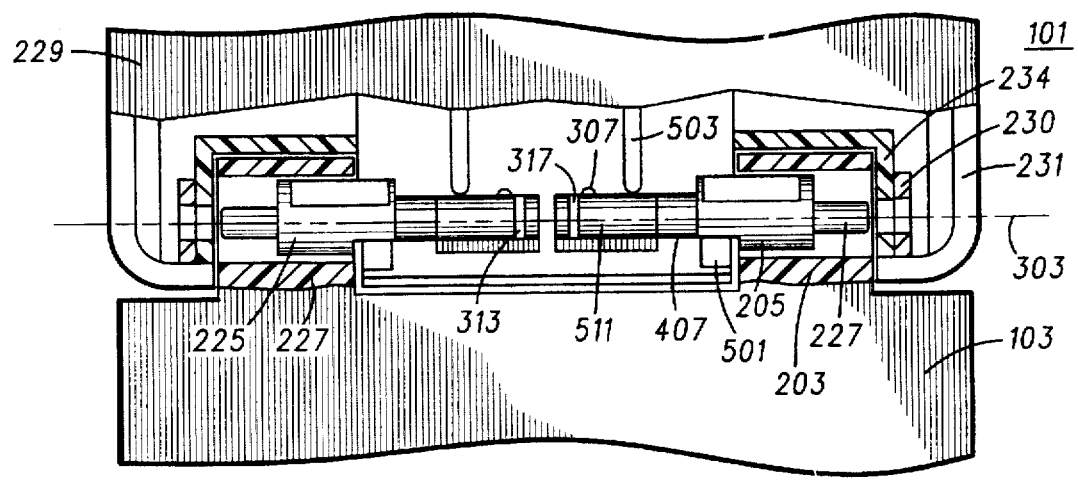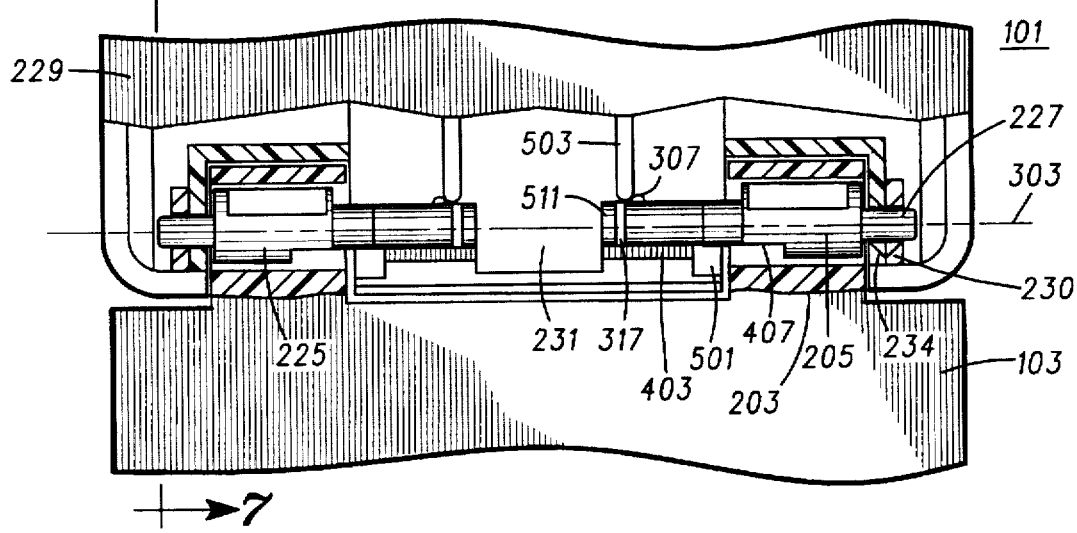

RADIOTELEPHONE HAVING A HINGE APPARATUS INCLUDING A SELF-LATCHING HINGE SHAFT

This is a continuation of application Ser. No. 08/386,172 filed on Feb. 9, 1995, now Pat. No. 5,629,979, which is a continuation of 07/696,430 filed on May 6, 1991 and is now abandoned.

FIELD OF THE INVENTION

This invention relates generally to hinged housings for miniature electronic equipment and more particularly to foldable radiotelephones which utilize hinged housings for folding elements.

BACKGROUND OF THE INVENTION

Portable, cellular phones are increasingly utilized to permit a user to communicate telephonically over a wireless system at virtually any location. The portable telephone transmits a low wattage, radio frequency signal to a receiving station whereat connections are provided with conventional telephone systems. Numerous receiving stations are spaced apart at fixed locations in an area to receive the signals transmitted by the portable telephone as the portable telephone is relocated throughout the area.

Telephones utilizing two housing elements connected with some type of hinging mechanism, are common in wireline telephone sets and landline wireless extension phones and have become more common in portable cellular radiotelephones. This folding arrangement allows for the telephone to be more compact when the two housings are foldable upon themselves. Radiotelephones which utilize this type of design usually have most or all of the electronics within the larger of the two housings, herein after called the body portion. The smaller housing will hereinafter be called the flip element.

A variety of hinge mechanisms have been used to rotatably couple the flip element to the body portion. One such hinge mechanism was described in U.S. Pat. No. 4,897,873 by Beutler et al. Beutler discloses a hinge mechanism having two essentially cylindrical hinge shafts rotatably coupling the flip element to the body portion. The assembly of Beutler's hinge mechanism, however, is both clumsy and time consuming. The hinge assembly also requires a spacer which snaps into the body portion to separate the hinge shafts thereby maintaining them in their properly assembled position.

The body portion of the telephone usually has a front and a rear housing portion which mate together to form the body portion. Beutler describes the flip element primarily residing in the front housing portion. During the assembly of the telephone in a factory, it is desirable to test the hinge mechanism portion rotatably coupling the flip element to the front housing portion before the front and rear housing portions are mated together. Accomplishing this test procedure requires that the hinge shafts are separated by the spacer snapped to the front housing portion. After the test procedure is completed, the spacer must be removed before the rear housing can be assembled to the front housing wherein the spacer may again be snapped into place. Before the spacer is snapped into place, the hinge shafts are free to move out of position thereby yielding a clumsy and time consuming assembly process.

A formidable challenge would be to design a hinge mechanism conducive to convenient operator assembly wherein the flip element portion may be tested with the front housing portion only and thereafter assembled with the rear housing portion without the need of an additional spacer to secure the hinge shafts in their proper position.

BRIEF DESCRIPTION OF THE DRAWINGS

FIG. 1a and 1b are front and side views of a portable radiotelephone which employs the present invention.

FIG. 3 is a first isometric view of a hinge shaft shown in FIG. 2.

FIG. 4 is a second isometric view of a hinge shaft shown in FIG. 2.

FIG. 5 is a cut-away view of the hinge portion of the radiotelephone as shown in FIG. 1 wherein the hinge shafts in their unlatched position.

FIG. 6 is a cut-away view of the hinge portion of the radiotelephone as shown in FIG. 1 wherein the hinge shafts in their latched position.

BRIEF DESCRIPTION OF THE PREFERRED EMBODIMENT

Figure 2:
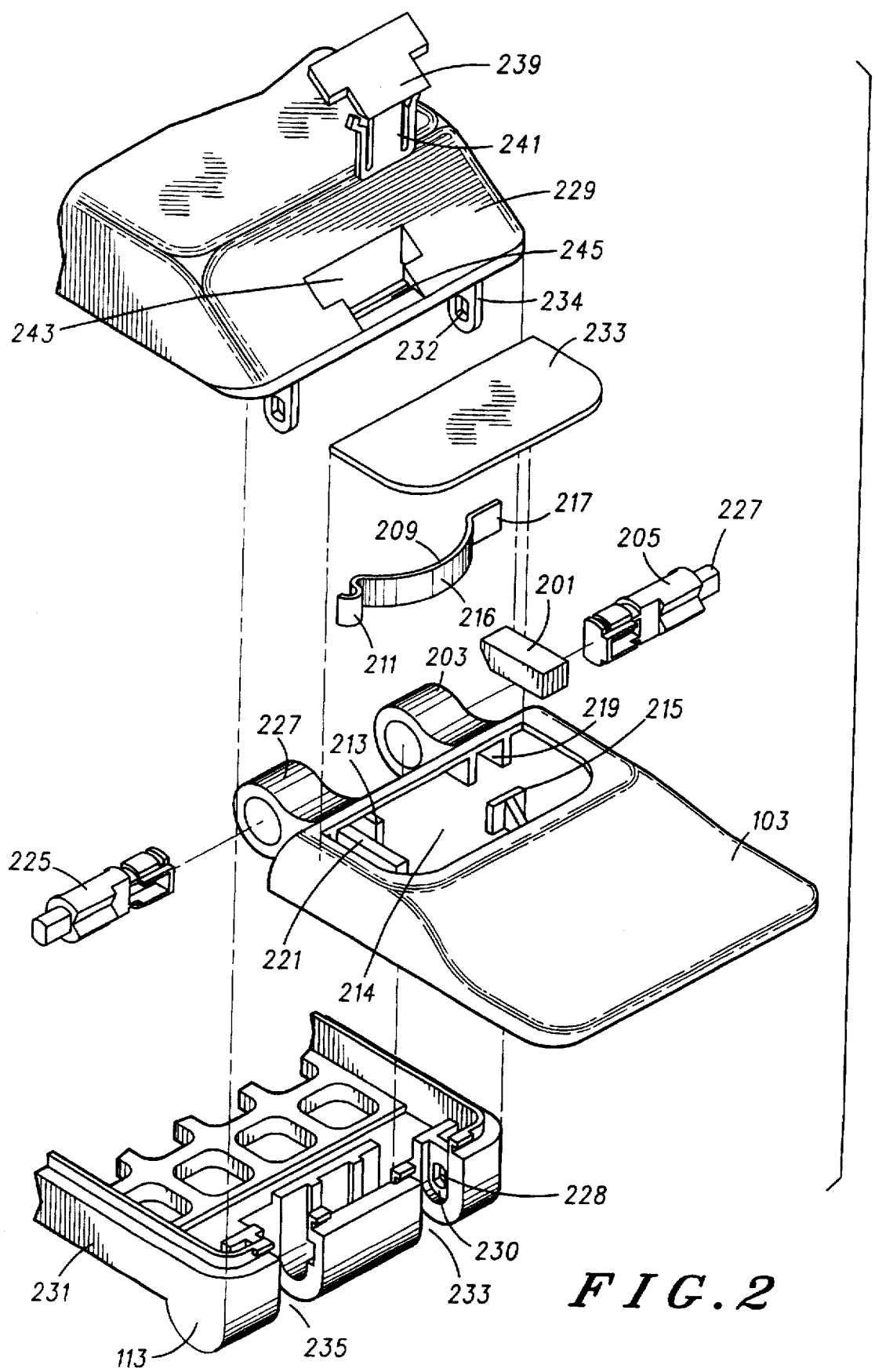
FIG. 2 is an exploded view of a body portion and a flip element illustrating the hinge assembly of the radiotelephone shown in FIG. 1.

A portable radiotelephone unit 100 adapted for use in a radiotelephone system is shown in FIGs. 1a and 1b. The portable unit 100 includes two readily apparent portions, a body portion 101 and a flip element portion 103. The present invention is located in a hinge portion 113 of the radiotelephone which rotatably couples the flip element 103 to the body portion 101. The drawing of FIG. 3 shows the flip element in an "open" position such that a user of the portable unit may listen via earpiece 105 and may speak into a microphone 107. The keypad 109 consists of a plurality of buttons numbered 1 through 0, # and *, in a familiar telephone arrangement. The keypad 109 may also have additional function buttons such as volume control and other buttons associated with telephone number recall. An antenna 111 enables wireless communication between the portable unit and a remote base site.

When the flip element 103 is open as shown in FIG. 1a and 1b, the portable unit can be in a state of answering or making a telephone call. Such a state is commonly known as "off-hook". Upon completion of a telephone call, the user may hang up the portable unit by moving the flip element to a closed position. The flip element in the closed position is commonly known as "on-hook". This hanging-up may be accomplished by causing the flip element 103 to rotate about the axis of the hinge portion 113 so that the flip element portion 103 rests against the keypad 109. This action activates a "hook-switch" which causes the telephone call to be terminated. In the closed position the portable unit 100 is in a standby state ready to receive an incoming call. Upon receiving an incoming call, the flip element 103 may be rotated about the axis of the hinge portion 113 to its open position thereby activating the "hook-switch" which enables the radiotelephone to answer the call.

In the preferred embodiment of the present invention, the flip element 103 is held in the open or closed position by a combination of elements shown in FIG. 2. A detent follower 201 is placed within a hinge knuckle 203 and forced against a cylindrical hinge shaft 205 by a resilient medium such as a spring 209. The spring 209 is formed from a flat curved piece of steel having a first end 211 hooked against a projection 213 in a space 214 within the flip element 103. The center portion of the spring 216 presses against a post 215 such that a second end of the spring 217 forces the detent follower 201 through an aperture 219 into the hinge knuckle 203. The design of the hinge shaft 205 allows the flip element 103 to be held against the keypad 109 in the on-hook or closed position and at an obtuse angle (for example, 150°) in the off-hook or open position. A magnet 221 within the flip element 103 generates the hook-switch control signal in the body portion 101 responsive to the rotational orientation of the flip element with respect to the body portion. A cover 233 conceals the spring 209, and the magnet 221 within the space 214 of the flip element 103.

A second hinge shaft 225, having essentially the same features and shape as a first hinge shaft 205, is disposed within a second hinge knuckle 227. The hinge knuckles, 203 and 227, of the flip element are located within corresponding slots 233 and 235 in the hinge portion 113. Each hinge shaft 205 and 225 are aligned and secured to the body portion 101 such that the hinge knuckles 203 and 227 are free to rotate about the hinge shafts 205 and 225, respectively.

A rear housing portion 229 is attached to the front housing portion 231 using conventional assembly techniques. When the hinge portion 113 is fully assembled a first end 227 of the hinge shaft 205 is disposed within an aperture 228 in an upstanding wall in the front housing portion 230 and an aperture 232 in an upstanding wall in the rear housing portion 234. By interlocking the front and rear housing portions with an end of the hinge shaft, the structural integrity of the hinge portion 113 is preserved. Similarly, the second hinge shaft 225 interlocks the front and rear housing portions at the other end of the hinge portion 113.

A cap 239, having a U shaped spring member 241 is attached to the rear housing portion 229 such that the cap covers an external connector aperture 243 and the U shaped spring member portion 241 is inserted into a slot 245. The unique purpose of the U-shaped spring member will be discussed with FIG. 8.

The present invention utilizes a novel hinge shaft design enabling the hinge shaft to be slideably positioned to a latched and an unlatched position within the hinge portion 113. Thus, the aforementioned spacer used by Beutler is eliminated and the hinge assembly process is improved. The unlatched position is an assembly position in which the flip element 103 and hinge shafts may be aligned with the hinge portion 113. The latched position is an interlocking an securing position which interlocks the front and rear housing portions 231 and 229 and secures the rotational orientation of the hinge shafts to the body portion 101. An advantage of the present invention enables the attachment of the flip element 103 to the front housing portion 231 without the rear housing portion 229 or the aforementioned spacer used by Beutler to implement a test procedure. Another distinct advantage of the present invention enables assembly or repair personnel to manually repositioned the hinge shafts between their latched and unlatched positions from the outside of the body portion through the slot 245.

A first isometric view of the hinge shaft 205 is illustrated in FIG. 3. Details describing the implementation of the novel features described on the hinge shaft 205 will be discussed with FIGS. 5 and 6. The following description also applies to the second hinge shaft 225. A primary feature of the present invention is the novel construction of the hinge shaft. The hinge shaft, having an essentially cylindrically shape, includes unique features for aligning the flip element relative to the body portion and allowing the hinge shaft to be removably latched to the body portion.

The hinge shaft is removably latched to the body portion by utilizing an spring arm 301 disposed parallel to a center axis 303 of the hinge shaft 205. The spring arm has a fixed end 302 attached to the hinge shaft 205 and a free end 304 surrounded by free space. The thickness of the material comprising the spring arm 301 is such that a protrusion 305, attached to the free end of the hinge shaft 304, is allowed to flex. The protrusion 305 has an end portion having a radius 307 enabling the spring arm 301 to deflect when the end portion of the protrusion 307 encounters mechanical interference with another part as the hinge shaft 205 is slideably positioned along its center axis 303. The spring arm 301 is surrounded on three sides by a rectangular shaped frame 309 allowing the spring arm 301 to move freely within the frame 309. The frame 309 is disposed essentially along the axis of the hinge shaft 303. The frame 309 includes a first side 311 having a rectangular shaped notch 313 extending across the first side 311. Likewise, the frame 309 has a second side 315 with a corresponding second notch 317 essentially opposite the notch 313. The first and second sides of the frame join a surface called a stop 321 essentially perpendicular to the center axis 303 which limits the axial positioning of the hinge shaft.

The hinge shaft 205 includes a recess 319 which accepts the detent follower 201 to position the flip element with respect to the body portion. The hinge shaft 205 also includes the elongated first end portion 227 disposed on the axis of rotation of the hinge shaft 303, to aid in securing the rotational orientation of the hinge shaft 205 along its axis of rotation 303 and interlock the front and rear housing portions.

FIG. 4 illustrates a second perspective view of the hinge shaft 205. FIG. 4 is derived by rotating the hinge shaft 205 of FIG. 3 approximately 180° about the axis of rotation of the hinge shaft 303. Novel features of the hinge shaft 205 described with FIG. 4 will be more fully explained with FIGS. 5 and 6.

Novel features illustrated in FIG. 4 include a guide 401 disposed on the frame of the hinge shaft 309 essentially parallel to the axis of rotation of the hinge shaft 303. The guide 401 includes rails 403 and 405 partially extending above the frame 309. The backside of the spring arm 301 may be viewed within the frame 309. Notches 313 and 317 may also be viewed in their respective sides of the frame 311 and 315.

Another unique feature of the hinge shaft is the cut out 407 extending across the width of the hinge shaft 205 essentially perpendicular to the axis of rotation 303. The cut out 407 has a U-shaped profile extending partially into the hinge shaft 205. The rails 403 and 405 extend into the U-shaped opening of the cut out 407.

This second perspective view also includes a recess 409 for maintaining the flip element in a second rotational position respective to the body portion.

A cut-away view of the flip element 103 partially assembled to the body portion 101 is shown in FIG. 5. A primary feature of the preferred embodiment of the present invention is that the hinge shafts 205 and 225 have at least two axial positions along the axis of rotation 303 of the hinge mechanism. The first axial position is an unlatched position and the second axial position is a latched position. FIG. 5 shows the hinge shafts in their unlatched position which is advantageously utilized to assemble the flip element 103 to the body portion 101. The hinge shafts 205 and 225 are partially disposed within hinge knuckles 203 and 227, respectively.

The hinge shaft 205 is rotationally orientated about the axis of rotation 303 such that the cut out 407 of the hinge shaft 205 is allowed to slide past an overhang 501 of the front housing portion 231. The side of the hinge shaft 205 opposite the cut out 407 is captivated by a rib 503 of the front housing portion 231. The end portion of the spring arm 307 of the hinge shaft 205 is essentially parallel and adjacent to the rib 503 and also offset from the rib 503. The notch 317 of the hinge shaft 205 is essentially perpendicular to the axis of rotation 303. The hinge shaft 205 is only partially disposed within the hinge knuckle 203 thereby allowing the end of the hinge shaft 227 to clear the upstanding wall portion of the front housing 230 and the upstanding wall portion of the rear housing 234.

FIG. 6 illustrates a cut-away view of the flip element 103 secured to the body portion 1101 responsive to the hinge shafts 205 and 225 located in a second axial position. In the second axial position, the hinge shafts are latched to the body portion 101 to secure their axial position and to interlock the front housing portion 231 to the rear housing portion 229. To locate the hinge shaft 205 in the latched position a simple tool such as a screw driver is inserted within the notch 317 in order to manually slide the hinge shaft along the axis of rotation 303. As the hinge shaft 205 is slideably positioned the end portion of the spring arm 307 interferes with the rib 503 thereby causing the spring arm to deflect towards the axis of rotation 303 and reposition itself on the opposite side of the rib 503. The hinge shaft 205 is latched in its second axial position through the interference of the end portion of the spring arm 307 and the rib 503.

The cut out of the hinge shaft 407 is slideably positioned within the hinge knuckle 203 such that the rail of the hinge shaft 403 is slideably positioned underneath the overhang 501. The interference between the rail 403 and the overhang 501 secures the rotational orientation of the second end of the hinge shaft 511. The first end of the hinge shaft 227 is inserted into the upstanding wall of the front housing portion 230 and the upstanding wall of the rear housing portion 234 such that the front and rear housing portions are interlocked along the axis of rotation 303. This interlocking feature is necessary to maintain the integrity of the hinge assembly in the event that the flip element 103 is twisted relative to the body portion 101 along the axis of rotation 303.

Per FIGS. 5 and 6, the preferred embodiment of the present invention includes a second hinge shaft rotatably coupling the flip element to the body portion 101 having essentially the same features as the first hinge shaft 205 but symmetrically disposed with respect to the first hinge shaft 205. The advantage of symmetrical design features is that the same hinge shaft may be used in both locations to economize molding cycle time and eliminate confusion on the assembly line. The advantages and features described with the first hinge shaft 205 may also be interpreted for the second hinge shaft 225.

Figure 7:
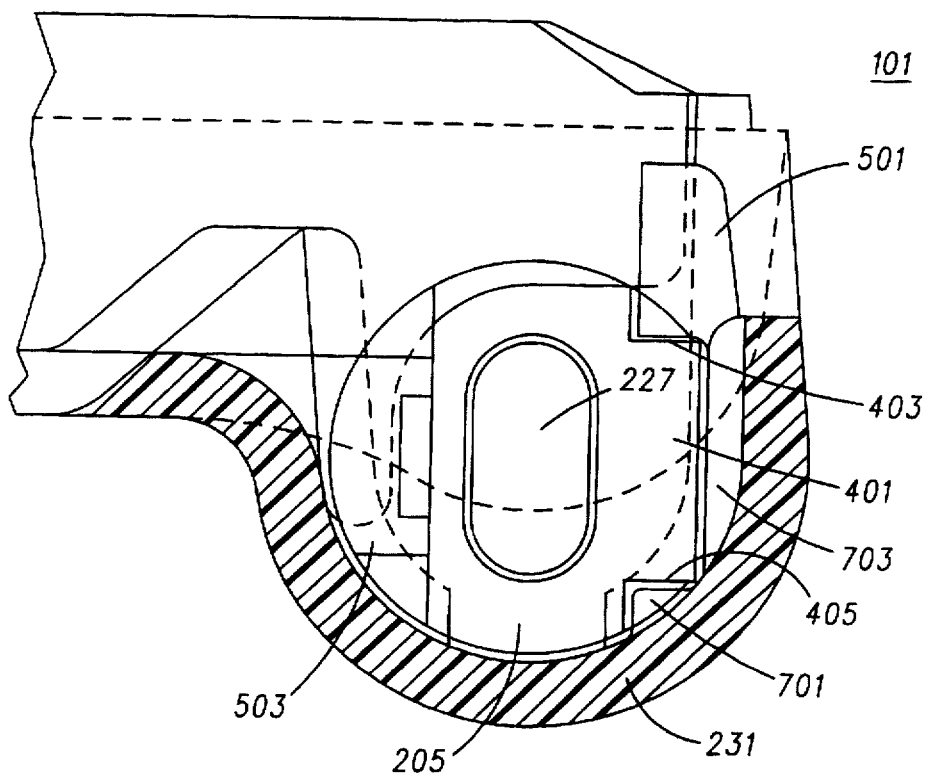
FIG. 7 is a sectional view of the hinge mechanism of the body portion showing the rotational orientation of the hinge shaft secured by the body portion when the hinge shaft is in its latched position.

FIG. 7 illustrates a cut-away view of the hinge portion described in FIG. 6. FIG. 7 clearly identifies the means by which the rotational orientation of the hinge shaft is secured to the body portion. The overhang 501 and a ledge 701 protruding from a wall 703 comprise a channel in the front housing portion 231 by which the guide 401 of the hinge shaft is captivated on three sides. The rail 403 of the guide is essentially parallel and adjacent to the overhang 501. Likewise, the rail 405 of the guide is essentially and adjacent to the ledge 701. Additionally, the rib 503 provides support to the side opposite the guide 401 of the hinge shaft 205. The guide 401 disposed within the channel 703 in combination with the rib 503 supporting the hinge shaft 205 secure the rotational orientation of one end of the hinge shaft. Means by which the rotational orientation of the first end of the hinge shaft is secured includes the elongated portion of the hinge shaft 227 disposed within an aperture having essentially the same shape but slightly larger than the elongated shape of the hinge shaft disposed within the upstanding walls of the front and rear housing portions.

Figure 8:
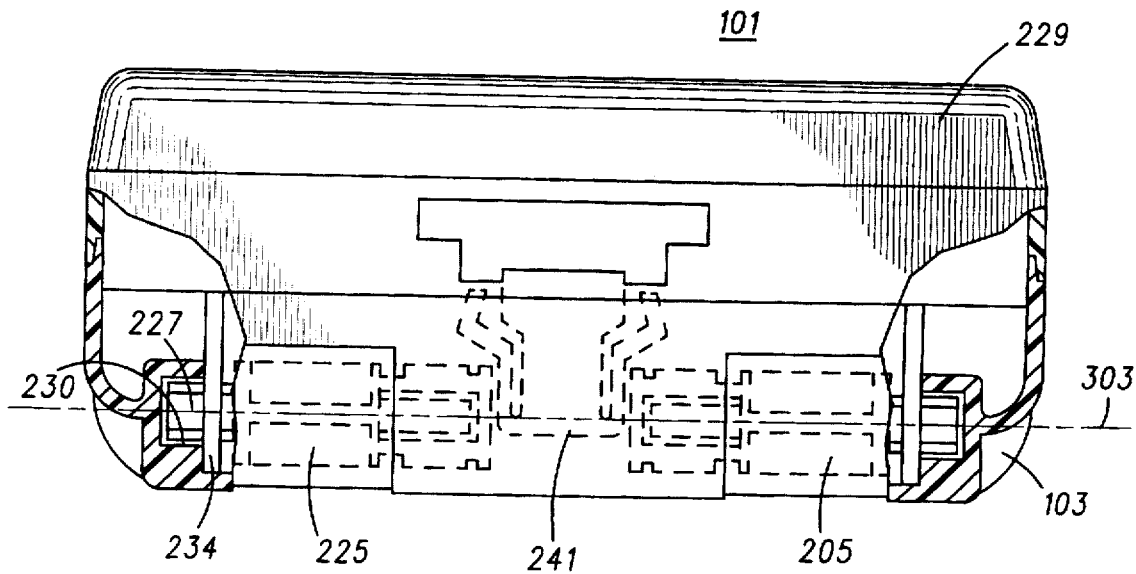
FIG. 8 is an end view of the radiotelephone with the flip element in its closed position wherein a temporary spacer assures that the hinge shafts are in their latched positions.

An end view of the radiotelephone having the flip element 103 in its closed position relative to the body portion 101 is illustrated in FIG. 8. The hinge shafts 205 and 225 are located in their latched position along the axis of rotation 303. The hinge shafts 205 and 225 are latched to the body portion in the second axial position thereby eliminating the need for the aforementioned spacer used by Beutler disposed between the hinge shafts in the hinge portion. The spring member of the cap 241 is disposed within the slot of the rear housing portion 229 such that the spring member fills the space in the hinge portion between hinge shafts 205 and 225 and secures the cap into place. The disposition of the spring member 241 is not necessary for proper assembly of the hinge shaft mechanism. The purpose of the spring member 241 is to assure that the hinge shafts 205 and 225 are properly latched to the body position 101. Once the radiotelephone is given to a customer the cap may be removed or lost without effecting the operation of the hinge mechanism.

FIG. 8 clearly exemplifies how the first end of the hinge shaft 227 interlocks the upstanding wall of the rear housing 234 to the upstanding wall of the front housing 230.

Therefore, a hinge mechanism for radiotelephone has been shown and described. This novel hinge apparatus eliminates the need for a separate spacing element necessarily used to separate the two hinge shafts during testing of the hinge assembly and final assembly by incorporating a unique self-latching hinge shaft.

What is claimed is:

1. A portable cellular radiotelephone comprising:

a transceiver;

an antenna coupled to the transceiver;

an earpiece transducer coupled to the transceiver;

a microphone transducer coupled to the transceiver;

a display coupled to the transceiver;

a keypad coupled to the transceiver;

a main housing containing the transceiver, the antenna, the earpiece transducer, the microphone transducer, the display and the keypad, wherein the keypad is located at a side of the main housing;

a keypad cover rotatably coupled to the main housing and movable relative to the main housing between an open position and a closed position, wherein the keypad cover is disposed adjacent to the side of the main housing and disposed over at least a portion of the keypad when the keypad cover is moved to the closed position, and wherein the keypad cover is disposed at an obtuse angle relative to the main housing when the keypad cover is moved to the open position;

a hinge apparatus, including at least a first hinge shaft, for rotatably coupling the keypad cover to the main housing about an axis of rotation, wherein the first hinge shaft is movable along the axis of rotation between at least a first position and a second position during the assembly of the keypad cover to the main housing, and wherein the first hinge shaft further comprises:

a first spring member, integrally formed with the first hinge shaft, for securing the first hinge shaft to the main housing in at least one of the first position and the second position along the axis of rotation; and a first cam surface and a second cam surface for positioning the keypad cover in the open position and the closed position, respectively, relative to the main housing responsive to a bias force exerted by a follower on the first cam surface and the second cam surface, respectively.

2. A portable cellular radiotelephone according to claim 1 further comprising:

a hinge cavity provided in the main housing and having an aperature disposed on the axis of rotation; and a hinge knuckle provided on the keypad cover and having an aperature disposed on the axis of rotation;

wherein the first hinge shaft is disposed at least partially in the aperture of the hinge cavity and at least partially in the aperture of the hinge knuckle when the first hinge shaft is located in at least one of the first position and the second position along the axis of rotation.

3. A portable cellular radiotelephone according to claim 1:

wherein the first hinge shaft has lateral surfaces and a circumferential surface, and wherein the first spring member further comprises a first spring arm integrally formed with the first hinge shaft and disposed parallel to the axis of rotation, the first spring arm having a first end attached to a lateral surface of the first hinge shaft and a second end disposed in free space, the second end of the first spring arm being permitted to flex in a direction substantially perpendicular to the axis of rotation, the first spring arm releasing the first hinge shaft from the main housing when the first hinge shaft is moved to the first position on the axis of rotation and retaining the first hinge shaft to the main housing when the first hinge shaft is moved to the second position on the axis of rotation.

4. A portable cellular radiotelephone according to claim 3 further comprising:

a protrusion disposed on the free end of the first spring arm and disposed essentially perpendicular to the axis of rotation; and an edge retaining surface provided in the hinge cavity and disposed essentially perpendicular to the axis of rotation, wherein the first spring arm deflects when the protrusion makes interfering contact with the edge retaining surface when the first hinge shaft is moved between the first and second axial positions to permit the protrusion to be positioned adjacent to the edge retaining surface when the first hinge shaft is moved to the second axial position.

5. A portable cellular radiotelephone according to claim 1 wherein the hinge apparatus further comprises:

a second hinge shaft for rotatably coupling the keypad cover to the main housing about an axis of rotation, wherein the second hinge shaft is movable along the axis of rotation between at least a first position and a second position during the assembly of the keypad cover to the main housing, and wherein the second hinge shaft further comprises:

a second spring member for securing the second hinge shaft to the main housing in at least one of the first position and the second position along the axis of rotation; and a first cam surface and a second cam surface for positioning the keypad cover in the first position and the second position, respectively, relative to the main housing responsive to a bias force exerted by a follower on the first cam surface and the second cam surface, respectively.

6. A portable cellular radiotelephone according to claim 5:

wherein the second hinge shaft has lateral surfaces and a circumferential surface, and wherein the second spring member of the second hinge shaft further comprises a second spring arm integrally formed with the second hinge shaft and disposed parallel to the axis of rotation, the second spring arm having a first end attached to a lateral surface of the second hinge shaft and a second end disposed in free space, the second end of the second spring arm being permitted to flex in a direction substantially perpendicular to the axis of rotation, the second spring an releasing the second hinge shaft from the main housing, when the second hinge shaft is moved to the first position on the axis of rotation and retaining the second hinge shaft to the main housing when the second hinge shaft is moved to the second position on the axis of rotation.

7. A radiotelephone comprising:

a main housing having a side;

a keypad with pushbuttons being located on the side of the main housing;

a cover being substantially planar;

a hinge apparatus, including at least a first hinge shaft, for rotatably coupling the cover to the main housing about an axis of rotation, the cover being movable between an open position and a closed position, the cover being positioned at an obtuse angle relative to the main housing when the cover is in the open position, the cover being positioned adjacent to the side of the main housing and covering at least one of the pushbuttons when the cover is in the closed position, the first hinge shaft further comprising:

a first spring member, integrally formed with the first hinge shaft, for releasably securing the first hinge shaft to the main housing along the axis of rotation; and a first cam surface and a second cam surface for positioning the keypad cover in the open position and the closed position, respectively, relative to the main housing responsive to a bias force exerted by a follower on the first cam surface and the second cam surface, respectively.

8. A radiotelephone according to claim 7 wherein the hinge apparatus further comprises:

a hinge cavity formed in the main housing and having an opening disposed on the axis of rotation; and a hinge knuckle formed on the cover and having an opening disposed on the axis of rotation;

wherein the first hinge shaft is located at least partially in the opening of the hinge cavity and at least partially in the opening of the hinge knuckle when the hinge apparatus is assembled.

9. A radiotelephone according to claim 7 wherein the spring member further comprises:

a first spring arm integrally formed with the first hinge shaft and disposed parallel to the axis of rotation, the first spring arm having a first end attached to the first hinge shaft and a second end disposed in free space the second end of the first spring arm being permitted to flex in a direction substantially perpendicular to the axis of rotation, the first spring arm retaining the first hinge shaft to the main housing on the axis of rotation.

10. A radiotelephone according to claim 9 wherein the hinge apparatus further comprises:

a protrusion disposed on the free end of the first spring arm in an orientation essentially perpendicular to the axis of rotation and facing away from the first hinge shaft; and an edge surface formed in the hinge cavity and disposed essentially perpendicular to the axis of rotation, the edge surface causing the first spring arm to deflect towards the first hinge shaft when the protrusion makes interfering contact with the edge surface, the edge surface being positioned adjacent to the protrusion when the hinge apparatus is assembled.

11. A radiotelephone according to claim 10 wherein the hinge apparatus further comprises:

a second hinge shaft, for rotatably coupling the cover to the main housing about an axis of rotation, the second hinge shaft having:

a second spring member for releasably securing the second hinge shaft to the main housing along the axis of rotation; and a first cam surface and a second cam surface for positioning the keypad cover in the open position and the closed position, respectively, relative to the main housing responsive to a bias force exerted by a follower on the first cam surface and the second cam surface, respectively.

12. A radiotelephone according to claim 11 wherein the spring member of the second hinge shaft further comprises:

a second spring arm integrally formed with the second hinge shaft and disposed parallel to the axis of rotation, the second spring arm having a first end attached to the second hinge shaft and a second end disposed in free space, the second end of the second spring arm being permitted to flex in a direction substantially perpendicular to the axis of rotation, the second spring arm retaining the second hinge shaft to the main housing on the axis of rotation.

13. A radiotelephone comprising:

a transceiver;

a main housing containing the transceiver and having a side;

a keypad with pushbuttons being coupled to the transceiver and being located on the side of the main housing;

a cover being substantially planar;

a hinge apparatus comprising:

at least a first hinge shaft for rotatably coupling the cover to the main housing about an axis of rotation, the cover being movable between an open position and a closed position, the cover being positioned at an obtuse angle relative to the main housing when the cover is in the open position, the cover being positioned adjacent to the side of the main housing and covering at least one of the pushbuttons when the cover is in the closed position, wherein the first hinge shaft further comprises:

a spring member, integrally formed with the first hinge shaft, for releasably securing the first hinge shaft to the main housing along the axis of rotation, the spring member further comprising:

a spring arm being disposed parallel to the axis of rotation, the spring arm having a first end attached to the first hinge shaft and a second end disposed in free space, the second end of the spring arm being permitted to flex in a direction substantially perpendicular to the axis of rotation; and a protrusion being disposed on the free end of the spring arm in an orientation essentially perpendicular to the axis of rotation and facing away from the first hinge shaft wherein the spring arm in combination with the protrusion retain the first hinge shaft in a position on the axis of rotation when the hinge apparatus is assembled; and a first cam surface and a second cam surface for positioning the keypad cover in the open position and the closed position, respectively, relative to the main housing responsive to a bias force exerted by a follower on the first cam surface and the second cam surface, respectively, a hinge cavity formed in the main housing and having an opening disposed on the axis of rotation, the hinge cavity further comprising:

an edge surface formed in the hinge cavity and disposed essentially perpendicular to the axis of rotation, the edge surface causing the spring arm to deflect towards the first hinge shaft when the protrusion makes interfering contact with the edge surface, the edge surface being positioned adjacent to the protrusion when the hinge apparatus is assembled; and a hinge knuckle formed on the cover and having an opening disposed on the axis of rotation, wherein the first hinge shaft is located at least partially in the opening of the hinge cavity and at least partially in the opening of the hinge knuckle when the hinge apparatus is assembled.

* * * * *